United States Patent
Lin

(10) Patent No.: US 6,847,396 B1
(45) Date of Patent: Jan. 25, 2005

(54) INTERPOLATION METHOD FOR PRODUCING FULL COLOR IMAGES IN USING A SINGLE-CHIP COLOR SENSOR

(75) Inventor: Kun-Wei Lin, Hsinchu (TW)

(73) Assignee: Sunplus Technology Co., Ltd. (TW)

( * ) Notice: Subject to any disclaimer, the term of this patent is extended or adjusted under 35 U.S.C. 154(b) by 0 days.

(21) Appl. No.: 09/559,416

(22) Filed: Apr. 26, 2000

(51) Int. Cl.$^7$ .......................... H04N 3/14; H04N 5/335; H04N 9/04; H04N 9/083
(52) U.S. Cl. ..................................................... 348/273
(58) Field of Search ........................ 348/280, 242, 348/250, 231.6, 167, 273, 276, 277, 278, 272; 382/299, 300, 273, 163

(56) References Cited

U.S. PATENT DOCUMENTS

| | | | | |
|---|---|---|---|---|
| 3,971,065 A | * | 7/1976 | Bayer | 348/276 |
| 4,630,307 A | * | 12/1986 | Cok | 382/165 |
| 4,642,678 A | * | 2/1987 | Cok | 348/242 |
| 5,373,322 A | * | 12/1994 | Laroche et al. | 348/273 |
| 5,805,217 A | * | 9/1998 | Lu et al. | 348/273 |
| 6,642,962 B1 | * | 11/2003 | Lin et al. | 348/252 |
| 6,664,955 B1 | * | 12/2003 | Deering | 345/418 |

OTHER PUBLICATIONS

Charles A. Poynton, Frequently Asked Questions ablut Color, Mar. 2, 1997, www.inforamp.net/~poyntonpoynton@inforamp.net.*

* cited by examiner

Primary Examiner—Wendy R. Garber
Assistant Examiner—Timothy J. Henn
(74) Attorney, Agent, or Firm—Lowe Hauptman Gilman & Berner, LLP

(57) ABSTRACT

An interpolation method for producing full color images is disclosed. For a blue pixel, an interpolated green value is determined by green values of adjacent green pixels, and an interpolated red value is determined by red values of neighboring red pixels and a modification value. For a red pixel, an interpolated green value is determined by green values of adjacent green pixels, and an interpolated blue value is determined by blue values of neighboring blue pixels and a modification value. For a green pixel, an interpolated green value is determined by original green value of the green pixel and green values of neighboring green pixels, an interpolated red value is determined by red value of at least an adjacent red pixel and a modification value, and an interpolated blue value is determined by blue value of at least an adjacent blue pixel and a modification value.

17 Claims, 3 Drawing Sheets

FIG.6
PRIOR ART

INTERPOLATION METHOD FOR PRODUCING FULL COLOR IMAGES IN USING A SINGLE-CHIP COLOR SENSOR

BACKGROUND OF THE INVENTION

1. Field of the Invention

The present invention pertains to electronic imaging, in particular to the generation of interpolated color images.

2. Description of Related Art

Currently, because of the advantages of having simple structure and being easily operated, the single-chip color sensor is in wide spread use in color electronic cameras to capture images. Generally, a single-chip color sensor has a plurality of pixels arranged in same form of two-dimensional array, and the sensor is covered by a color filter. The color filter has three primary colors including red (denoted by "R"), blue (denoted by. "B") and green (denoted by "G"). When capturing images, each pixel can only sense the signal value of a corresponding primary color, while missing the values of the other two primary colors. Therefore, an image processing method must be further utilized to determine the values of the two missing colors for the pixel. Such an image processing method is related to the arrangement of the three primary colors in the color filter. One of the most commonly used color arrangements, known as the Bayer pattern, is described in U.S. Pat. No. 3,971,065. The Bayer pattern is shown in FIG. 6, wherein each color covers a pixel of the sensor. In particular, the R and B colors are interspersed among a checkerboard pattern of G colors.

As well known to those skilled in the art, an interpolation method is often provided to increase the number of image sampling points in processing images. This interpolation method can also be used to determine the interpolated values of the missing colors for each pixel in an image system utilizing the single-chip color sensor, so as to compensate for those missing colors, thereby producing a full color image and maintaining the resolution. However, as one can expect, if the interpolated values determined by the interpolation method are not close to the actual ones, a known false color problem will be encountered. Moreover, because of limitation in the manufacturing process, the pixels in the sensor are rarely identical. In particular, with reference to FIG. 5, the G pixels in line 51 are alternately arranged with the B pixels, while the G pixels in line 52 are alternately arranged with the R pixels. Therefore, the G pixels in the line 51 and 52 are usually not identical. The use of a sensor with such different G pixels to capture images may encounter a check pattern noise problem.

Several issued patents are provided to produce full color images by interpolation techniques. In U.S. Pat. No. 4,642,678, a signal processing method is disclosed for producing interpolated chrominance (i.e. R or B color) values in a sampled color image signal. In the method, hue values at neighboring chrominance component sample locations are produced as a function of a luminance (i.e. G color) value and the chrominance value at the neighboring locations. A signal representing an interpolated hue value is produced as a function of neighboring hue values. A signal representing an interpolated chrominance value is produced as a function of the interpolated hue value and a luminance value at the interpolated location.

A problem with the '678 patent is that it is prone to having a zigzag pattern on the edge of an image. This problem can be treated through use of more sophisticated interpolation techniques, such as described in U.S. Pat. No. 4,630,307, which first determines the geometric shapes, including edges, stripes and corners, contained in the image, and then applies different interpolation routines to different shapes. Because of the sophisticated procedure, this method performs the interpolation process at considerable cost and complexity in processing capability.

In U.S. Pat. No. 5,373,322 entitled "Apparatus and Method for Adaptively Interpolating a Full Color Image Utilizing Chrominance Gradients", adaptive interpolation is performed by apparatus operating upon a digitized image signal obtained from an image sensor. A digital processor obtains gradient values from the differences between chrominance values in vertical and horizontal image directions. The gradient values are compared with each other in order to select one of the directions as the preferred orientation for the interpolation of additional luminance values. The interpolation is then performed upon values selected to agree with the preferred orientation. The interpolation method of the '322 patent is able to enhance the image resolution and reduce the false color effect. However, the method requires a relative large memory space to store the sampled neighboring points for determining the missing color values of a pixel. In particular, a memory space capable of storing at least four sampling image lines must be provided to execute the interpolation process. If a single-chip color sensor has a resolution of 640×480, a total memory space of 640×4×8 bits must be provided.

Therefore, it is known that large memory space and complicated interpolation processes must be employed to perform conventional interpolation methods, which further results in complicated hardware structure and high power consumption. Furthermore, the check pattern noise problem is not removed in using the conventional interpolation methods. Accordingly, it is desired to have a novel interpolation method to obviate and/or mitigate the aforementioned problems.

SUMMARY OF THE INVENTION

The object of the present invention is to provide an interpolation method for producing full color images in using a single-chip color sensor.

To achieve the objective, the interpolation method in accordance with the present invention is provided to produce interpolated values for a sensor having a plurality of red, green and blue pixels. The interpolation method includes the steps of: (a) producing interpolated green and red values for a blue pixel, the interpolated green value being determined by green values of adjacent green pixels, the interpolated red value being determined by red values of neighboring red pixels and a modification value obtained from the green values of the adjacent green pixels; (b) producing interpolated green and blue values for a red pixel, the interpolated green value being determined by green values of adjacent green pixels, the interpolated blue value being determined by blue values of neighboring blue pixels and a modification value obtained from the green values of the adjacent green pixels; and (c) producing interpolated green, red and blue values for a green pixel, the interpolated green value being determined by an original green value of the green pixel and green values of neighboring green pixels, the interpolated red value being determined by the red value of at least an adjacent red pixel and a modification value obtained from the green values of the green pixel and neighboring green pixels, the interpolated blue value being determined by the blue value of at least an adjacent blue pixel and a modification value obtained from the green values of the green pixel and neighboring green pixels.

Other objects, advantages, and novel features of the invention will become more apparent from the following detailed description when taken in conjunction with the accompanying drawings.

BRIEF DESCRIPTION OF THE DRAWINGS

Figure 6:
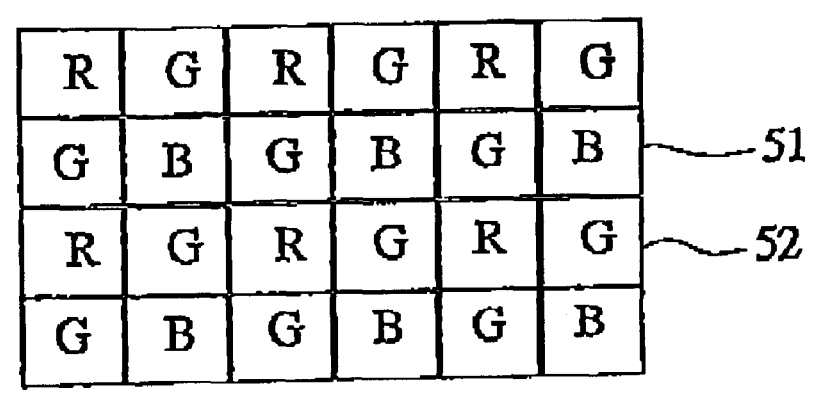

FIG. 6 is a diagram of the Bayer pattern for a color sensor.

DETAILED DESCRIPTION OF THE PREFERRED EMBODIMENT

Since the arrangement of the three primary colors in a single-chip color sensor is well known, the present description will be directed in particular to Bayer pattern forming part of, or cooperating more directly with, the method in accordance with the present invention. Color patterns not specifically shown or described herein may be selected from those known in the art.

Figure 1:
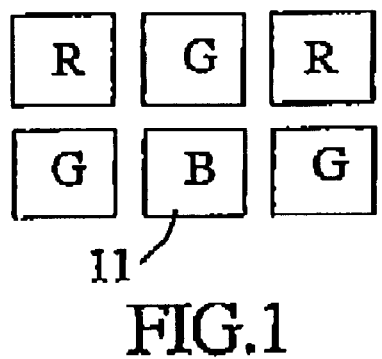
FIG. 1 is a diagram showing a part of a color pattern to determine the interpolated green and red values for a blue pixel.

With reference to FIG. 1, a part of the color pattern in a single-chip color sensor is shown to determine the interpolated G and R values for a B pixel 11. As shown, R1 and R2 are the values of the red pixels at the neighboring upper-left and upper-right locations of the B pixel 11, respectively. G1, G2 and G3 are the values of the green pixels at the adjacent left, upper and right locations of the B pixel 11, respectively. The interpolated G value for the B pixel 11 is determined as follows:

$$G=b \times G2 + a \times (G1+G3)/2, \quad (1)$$

where a and b are weighting coefficients, each having a value of 01 and preferably of 0.5. As seen, the interpolated G value of the B pixel 11 is determined by the G values of the adjacent G pixels that are contained in only two sampling image lines (i.e. the lines of RGR and GBG). Therefore, an image system utilizing the interpolation method in accordance with the present invention only requires one image delay line to buffer the sampled color values to execute the interpolation process. The required memory space to store the sampled values is also decreased in comparison with conventional interpolation methods because only three G values of the adjacent G pixels are used. Moreover, because the above formula for determining the interpolated G value utilizes pixels located in three columns and two rows, a better vertical resolution can be obtained. In addition, the use of the above formula does not suffer the check pattern noise because G values of different adjacent sampling lines are employed to determine the interpolated G value.

To determine the interpolated R value for the B pixel 11, the following formula is applied:

$$R=(R1+R2)/2 - c \times (2G2-G1-G3), \quad (2)$$

where c is a weighting coefficient having a value of 0~1. As seen, the interpolated R value is determined by the average of R1 and R2 and a modification value obtained from the G values of the adjacent G pixels. Such a modification value is employed to eliminate the false color problem. That is, because the interpolated R value is obtained by subtracting G2 from and adding G1 and G3 to the average of R1 and R2, the interpolated R value is always close to the actual R value. In particular, if the first sampling line (i.e. the line of RGR) is bright and the second sampling line (i.e. the line of GBG) is dark, G2 is large while G1 and G3 are small. By the effect of subtracting G2, the interpolated R value is small, and thus the second sampling line is kept dark. On the contrary, if the first sampling line is dark and the second sampling line is bright, G2 is small while G1 and G3 are large. Through the effect of adding G1 and G3, the interpolated R value is large, thereby keeping the second sampling line bright.

Figure 2:
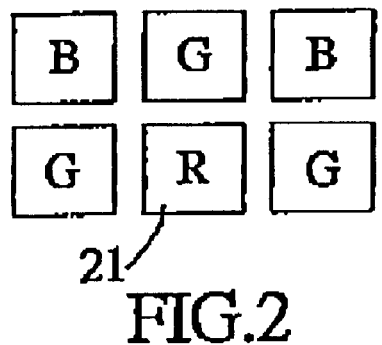
FIG. 2 is a diagram showing a part of a color pattern to determine the interpolated green and blue values for a red pixel.

FIG. 2 shows a part of the color pattern in a single-chip color sensor to determine the interpolated G and B values for a R pixel 21. As shown, B1 and B2 are the values of the blue pixels at the neighboring upper-left and upper-right locations of the R pixel 11, respectively. G1, G2 and G3 are the values of the green pixels at the adjacent left, upper and right locations of the R pixel 21, respectively. The interpolated G value for the R pixel 21 is determined as follows:

$$G=b \times G2 + a \times (G1+G3)/2, \quad (3)$$

where a and b are weighting coefficients, each having a value of 01 and preferably of 0.5. The interpolated B value for the R pixel 21 is determined as follows:

$$B=(B1+B2)/2c \times (2G2-G1-G3), \quad (4)$$

where c is a weighting coefficient having a value of 01. The above formulas (3) and (4) are analogous to formulas (1) and (2), respectively, and the reasons to apply formulas (3) and (4) to determine the interpolated color values for the R pixel are the same as those for the B pixel. Therefore, detailed description of the formulas (3) and (4) is deemed unnecessary.

Figure 3:
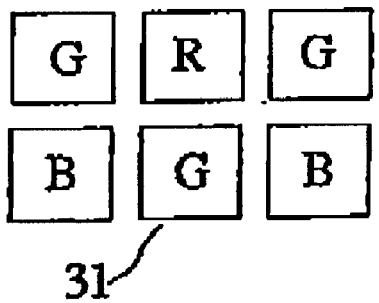
FIG. 3 is a diagram showing a part of a color pattern to determine the interpolated green, red and blue values for a green pixel.

FIG. 3 shows a part of the color pattern in a single-chip color sensor to determine the interpolated G, R and B values for a G pixel 31. As shown, G1 and G3 are the values of the green pixels at the neighboring upper-left and upper-right locations of the G pixel 31, respectively. B1 and B2 are the values of the blue pixels at the adjacent left and right locations of the G pixel 31, respectively. R is the value of the red pixel at the upper location of the G pixel 31. G2 is the value of the green pixel 31 itself. The interpolated G value for the G pixel 31 is determined as follows:

$$G=a \times G2 + b \times (G1+G3)/2, \quad (5)$$

where a and b are weighting coefficients, each having a value of 01. As seen, the interpolated G value is used to substitute the original green value (i.e. G2) for the G pixel 31, and this interpolated G value is determined by the original green value (G2) and the values of the neighboring G pixels (G1 and G3). Therefore, the check pattern noise caused by different G values in two adjacent image lines can be effectively eliminated.

To determine the interpolated R value for the G pixel 31, the following formula is applied:

$$R=R-e \times (2G2-G1-G3), \quad (6)$$

where e is a weighting coefficient having a value of 01. As seen, the interpolated R value is determined by the value of the adjacent R pixel and a modification value obtained from the neighboring G values (G1 and G3) and the G value (G2) of the interpolated pixel 31. Such a modification value is employed to eliminate the false color problem, and the reason is the same as that described for formula (2).

To determine the interpolated B value for the G pixel 31, the following formula is applied:

$$B=(B1+B2)/2+d\times(2G2-G1-G3), \quad (7)$$

where d is a weighting coefficient having a value of 0~1. As seen, the interpolated B value is determined by the averaged blue value of the adjacent B pixels and a modification value obtained from the values (G1 and G3) of the neighboring G pixels and the G value (G2) of the interpolated pixel 31. Again, such a modification value is employed to eliminate the false color problem, and the reason is the same as that described for formula (2).

Figure 4:
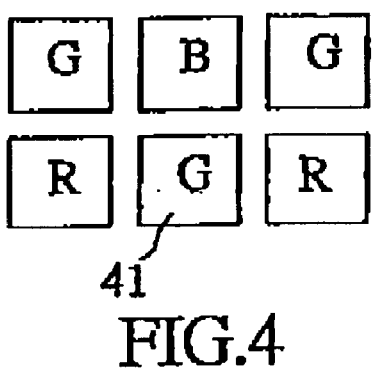
FIG. 4 is a diagram showing another part of a color pattern to determine the interpolated green, red and blue values for a green pixel.

With reference to FIG. 4, there is shown another possible color pattern in a single-chip color sensor to determine the interpolated G, R and B values for a G pixel 41. As shown, G1 and G3 are the values of the green pixels at the neighboring upper-left and upper-right locations of the G pixel 41, respectively. R1 and R2 are the values of the red pixels at the adjacent left and right locations of the G pixel 41, respectively. B is the value of the blue pixel at the upper location of the G pixel 41. G is the value of the green pixel 41 itself. The interpolated G value for the G pixel 41 is determined as follows:

$$G=a\times G2+b\times(G1+G3)/2, \quad (8)$$

where a and b are weighting coefficients, each having a value of 0~1. The interpolated R value for the G pixel 41 is determined as follows:

$$R=(R1+R2)/2+d\times(2G2-G1-G3), \quad (9)$$

where d is a weighting coefficient having a value of 0~1. The interpolated B value for the G pixel 41 is determined as follows:

$$B=B-e\times(2G2-G1-G3), \quad (10)$$

where e is a weighting coefficient having a value of 0~1. As seen, the above formulas (8), (9) and (10) are analogous to formulas (5), (7) and (6), respectively, and the reasons as well as the advantages to apply formulas (8), (9) and (10) to determine the interpolated color values for the G pixel 41 are the same as those for the G pixel 31. Therefore, detailed description of the formulas (8), (9) and (10) is deemed unnecessary.

Figure 5:
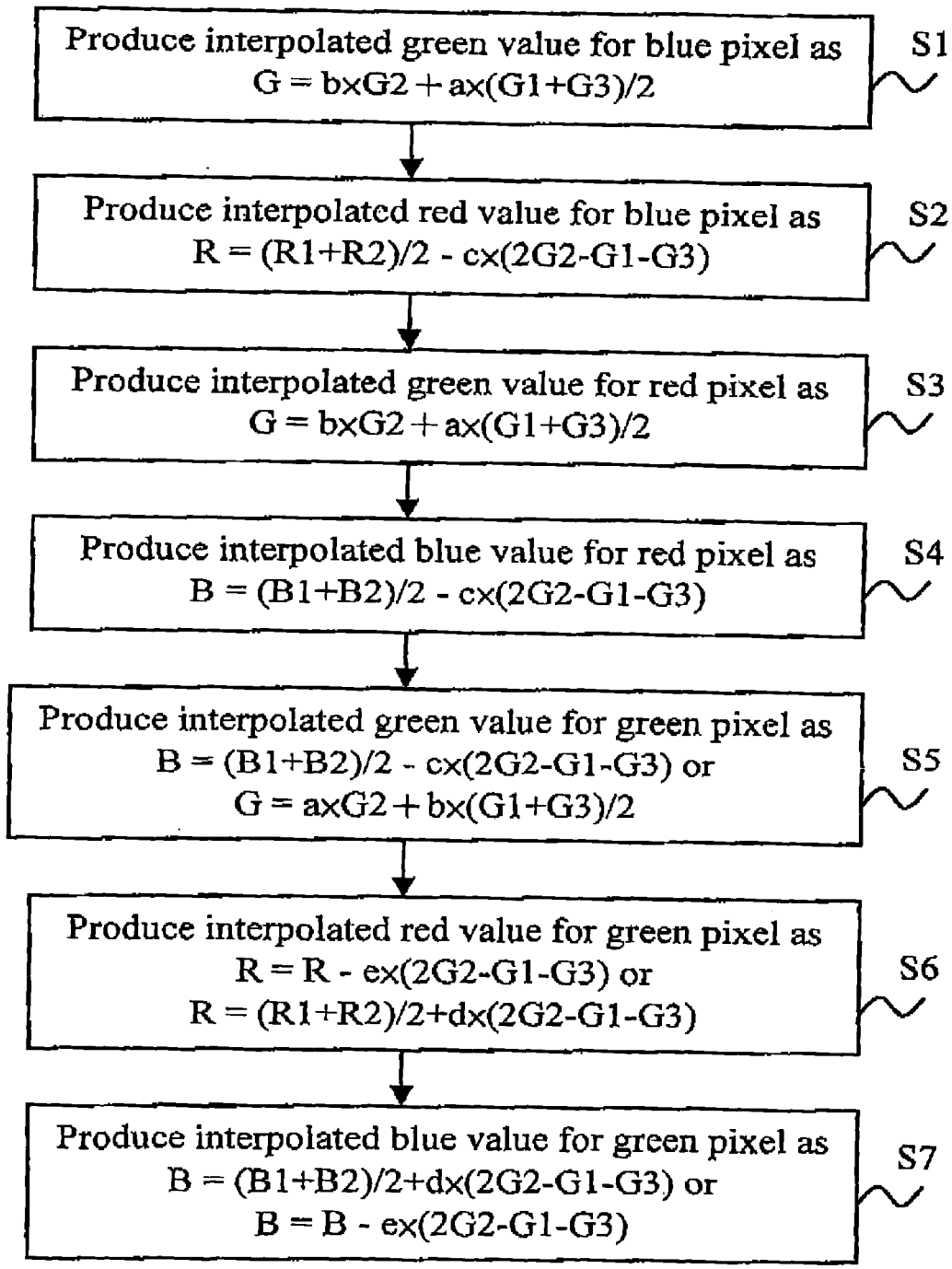
FIG. 5 is a flowchart illustrating the steps of the interpolation method for producing full color images in using a single-chin color sensor in accordance with the present invention.

In summary, the aforementioned steps to determined the interpolated colors for blue, red and green pixels are illustrated in FIG. 5, in which steps S1 and S2 are provided to produce the interpolated green and red values for blue pixel by using formulas (1) and (2), respectively, steps S3 and S4 are provided to produce the interpolated green and blue values for red pixel by using formulas (3) and (4), respectively, and steps S5, S6 and S7 are provided to produce the interpolated green, red and blue values for green pixel by using formulas (5) or (8), (6) or (9), and (7) or (10), respectively.

In view of the foregoing, it is appreciated that the method in accordance with the present invention is provided with the following advantages:

1. Only a small amount of memory space is required to accomplish the interpolation process.
2. Interpolated values are determined by simple mathematical operations so that the interpolation hardware is simple.
3. Only a small amount of operations is required and thus the power consumption is decreased.

Although the present invention has been explained in relation to its preferred embodiment, it is to be understood that many other possible modifications and variations can be made without departing from the spirit and scope of the invention as hereinafter claimed.

What is claimed is:

1. An interpolation method to produce interpolated values for a sensor having a plurality of red, green and blue pixels arranged in a form of two dimensional array having a plurality of sampling lines, each pixel sensing only one color, said interpolation method comprising the steps of:

producing interpolated green and red values for a blue pixel, said interpolated green value being determined by green values of adjacent green pixels, said interpolated red value being determined by red values of neighboring red pixels and a modification value obtained from the green values of said adjacent green pixels contained in two sampling image lines, wherein said interpolated green value is equal to b×G2+a×(G1+G3)/2, a and b being weighting coefficients, each having a value of a 0~1, G1, G2 and G3 being values of the green pixels at adjacent left, upper and right locations of said blue pixel, respectively;

producing interpolated green and blue values for a red pixel, said interpolated green value being determined by green values of adjacent green pixels, said interpolated blue value being determined by blue values of neighboring blue pixels and a modification value obtained from the green values of said adjacent green pixels; and producing interpolated green, red and blue values for a green pixel, said interpolated green value being determined by original green value of said green pixel, and green values of neighboring green pixels, said interpolated red value being determined by red value of at least an adjacent red pixel and a modification value obtained from the green values of said green pixel and neighboring green pixels, said interpolated blue value being determined by blue value of at least an adjacent blue pixel and a modification value obtained from the green values of said green pixel and neighboring green pixels.

2. The interpolation method as claimed in claim 1, wherein, in the step of producing interpolated green and red values for a blue pixel, said interpolated red value is determined by an averaged red value of said neighboring red pixels and a modification value obtained from the green values of said adjacent green pixels.

3. The interpolation method as claimed in claim 2, wherein, said interpolated red value is equal to (R1+R2)/2−c×(2G2−G131 G3), R1 and R2 being values of the red pixels at neighboring, upper-left and upper-right locations of said blue pixel, c being a weighting coefficient having a value of 0~1, G1, G2 and G3 being values of the green pixels at adjacent left, upper and right locations of said blue pixel, respectively.

4. The interpolation method as claimed in claim 1, wherein, in the step of producing interpolated green and blue values for a red pixel, said adjacent green pixels are contained in two sampling image lines.

5. The interpolation method as claimed in claim 4, wherein said interpolated green value is equal to b×G2+a× (G1+G3)/2, a and b being weighting coefficients, each having a value of 0~1, G1, G2 and G3 being values of the green pixels at adjacent left, upper and right locations of said blue pixel, respectively.

6. The interpolation method as claimed in claim 1, wherein, in the step of producing interpolated green and blue values for a red pixel, said interpolated blue value is determined by an averaged blue value of said neighboring blue pixels and a modification value obtained from the green values of said adjacent green pixels.

7. The interpolation method as claimed in claim 6, wherein said interpolated blue value is equal to $(B1+B2)/2 - c \times (2G2-G1-G3)$, c being a weighting coefficient having a value of 0~1, B1 and B2 being values of the blue pixels at neighboring upper-left and upper-right locations of said red pixel, respectively, G1, G2 and G3 being values of the green pixels at adjacent left, upper and right locations of said red pixel, respectively.

8. The interpolation method as claimed in claim 1, wherein, in the step of producing interpolated green, red and blue values for a green pixel, said interpolated green value is determined by original green value of said green pixel and values of neighboring green pixels.

9. The interpolation method as claimed in claim 8, wherein said interpolated green value is equal to $a \times G2 + b \times (G1+G3)/2$, a and b being weighting coefficients, each having a value of 0~1, G1 and G3 being values of the green pixels at neighboring upper-left and upper-right locations of said green pixel, respectively, G2 being the original green value of said green pixel.

10. The interpolation method as claimed in claim 1, wherein, in the step of producing interpolated green, red and blue values for a green pixel, said interpolated red value is determined by red value of an adjacent red pixel and a modification value obtained from green values of said neighboring green pixels and green value of said green pixel.

11. The interpolation method as claimed in claim 10, wherein said interpolated red value is equal to $R - e \times (2G2-G1-G3)$, e being a weighting coefficient having a value of 0~1, G1 and G3 being values of the green pixels at neighboring upper-left and upper-right locations of said green pixel, respectively, G2 being the original green value of said green pixel.

12. The interpolation method as claimed in claim 1, wherein, in the step of producing interpolated green, red and blue values for a green pixel, said interpolated blue value is determined by an averaged value of two adjacent blue pixels and a modification value obtained from green values of said neighboring green pixels and green value of said green pixel.

13. The interpolation method as claimed in claim 10, wherein said interpolated red value is equal to $(R1+R2)/2 + d \times (2G2-G1-G3)$, d being a weighting coefficient having a value of 0~1, B1 and B2 being blue values of the blue pixels at adjacent left and right locations of said green pixel, G1 and G3 being values of the green pixels at neighboring upper-left and upper-right locations of said green pixel, respectively, G2 being the original green value of said green pixel.

14. The interpolation method as claimed in claim 1, wherein, in the step of producing interpolated green, red and blue values for a green pixel, said interpolated blue value is determined by blue value of an adjacent blue pixel and a modification value obtained from green values of said neighboring green pixels and green value of said green pixel.

15. The interpolation method as claimed in claim 14, wherein said interpolated blue value is equal to $B - e \times (2G2-G1-G3)$, e being a weighting coefficient having a value of 0~1, B being the value of said adjacent blue pixel, G1 and G3 being values of the green pixels at neighboring upper-left and upper-right locations of said green pixel, respectively, G2 being the original green value of said green pixel.

16. The interpolation method as claimed in claim 1, wherein, in the step of producing interpolated green, red and blue values for a green pixel, said interpolated red value is determined by an averaged value of two adjacent red pixels and a modification value obtained from green values of said neighboring green pixels and green value of said green pixel.

17. The interpolation method as claimed in claim 16, wherein said interpolated red value is equal to $(R1+R2)/2 + d \times (2G2-G1-G3)$, d being a weighting coefficient having a value of 0~1, R1 and R2 being red values of the red pixels at adjacent left and right locations of said green pixel, respectively, G1 and G3 being values of the green pixels at neighboring upper-left and upper-right locations of said green pixel, respectively, G2 being the original green value of said green pixel.

\* \* \* \* \*